United States Patent
Kokubu et al.

(10) Patent No.: US 6,619,217 B2
(45) Date of Patent: Sep. 16, 2003

(54) DECOMPOSITION PROCESSING APPARATUS FOR PCB

(76) Inventors: Kanji Kokubu, 498-2, Taiseicho 3-chome, Saitama-shi, Saitama (JP); Yutaka Hayano, 5-3, Katase 3-chome, Fujisawa-shi, Kanagawa (JP); Masamitsu Iwasaki, 25-13-112, Umeda 7-chome, Adachi-ku, Tokyo (JP)

(*) Notice: Subject to any disclaimer, the term of this patent is extended or adjusted under 35 U.S.C. 154(b) by 0 days.

(21) Appl. No.: 10/046,586

(22) Filed: Nov. 7, 2001

(65) Prior Publication Data

US 2002/0110506 A1 Aug. 15, 2002

(30) Foreign Application Priority Data

Nov. 13, 2000 (JP) ........................................ 2000-344909
Sep. 18, 2001 (JP) ........................................ 2001-283814

(51) Int. Cl.[7] ............................. F23G 7/04; A62D 3/00
(52) U.S. Cl. ....................... 110/238; 110/248; 588/207; 588/208; 588/209
(58) Field of Search ...................... 110/238, 345, 110/346, 348; 422/198, 190, 195, 215, 171, 173, 176, 186.3; 588/207, 208, 226, 209, 228; 208/262.5; 202/96

(56) References Cited

U.S. PATENT DOCUMENTS

| 4,246,255 A | * | 1/1981 | Grantham | 423/659 |
|---|---|---|---|---|
| 4,340,471 A | * | 7/1982 | Jordan | 210/101 |
| 4,351,978 A | * | 9/1982 | Hatano et al. | 585/469 |
| 4,400,936 A | * | 8/1983 | Evans et al. | 60/274 |
| 4,526,677 A | * | 7/1985 | Grantham et al. | 208/262 |
| 4,961,391 A | * | 10/1990 | Mak et al. | 110/346 |
| 5,000,101 A | * | 3/1991 | Wagner | 110/346 |
| 5,082,012 A | * | 1/1992 | Massey et al. | 134/109 |
| 5,197,823 A | * | 3/1993 | Cutshall et al. | 405/128 |
| 5,245,113 A | * | 9/1993 | Schulz | 588/209 |
| 5,730,947 A | * | 3/1998 | Chaussonnet | 422/177 |
| 5,937,267 A | * | 8/1999 | Todori et al. | 422/186.3 |
| 6,235,963 B1 | * | 5/2001 | Yamauchi et al. | 588/205 |

FOREIGN PATENT DOCUMENTS

JP 58-62419 * 4/1983
JP 07236706 9/1995

OTHER PUBLICATIONS

J. Bentley Department of the Environment U.K., "Incineration of PCB's", (Partially translated).
Kobayashi, K. (Kobe Steel Ltd.): "Loop Accumulation Type Porous Ceramics", *Ceramics*, 23 (1988) No. 8, pp. 720–723.

* cited by examiner

*Primary Examiner*—Denise L. Esquivel
*Assistant Examiner*—K. B. Rinehart
(74) *Attorney, Agent, or Firm*—Notaro & Michalos P.C.

(57) ABSTRACT

A decomposition processing apparatus for PCBs prolongs the staying time of the PCBs in a vertical furnace. The apparatus heats and decomposes the PCBs and includes porous staying plates through which the falling PCBs pass, to delay the progress of the PCBs through the apparatus and thus subject the PCBs to sufficient thermolysis.

14 Claims, 5 Drawing Sheets

DECOMPOSITION PROCESSING APPARATUS FOR PCB

TECHNICAL FIELD

The present invention relates to a decomposition processing apparatus for PCB which heats and decomposes liquid PCB (polychlorinated biphenyl). More particularly, the present invention relates to a decomposition processing apparatus for subjecting liquid PCB to thermolysis by utilizing a heating device such as a blast furnace.

BACKGROUND ART

Since liquid PCB (which will be simply referred to as "PCB" hereinafter) has an excellent electrical insulating characteristics, it has been widely utilized as an electrical insulator in the past. However, even though PCB is subjected to disposal after use, it is not decomposed and pollutes air, water, soil and others. Further, it enters human bodies through foods, and it is also hard to be decomposed in human bodies. It takes time for PCB to be excreted and it is hence accumulated in the human bodies. Therefore, processing for defusing the existing PCB is demanded.

In order to decompose and defuse PCB, there has been generally adopted a technique for performing thermolysis by using a heating device. Its conditions are as shown in, for example, Table 1. As apparent from this table, a heating temperature must be increased and a staying time of PCB in the heating device must be also prolonged in order to improve a decomposition ratio of PCB.

TABLE 1

| Temperature (° C.) | Staying Time (seconds) | Decomposition Ratio (%) |
| --- | --- | --- |
| 900 | 1.0 | 99.988 |
| 1000 | 1.0 | 99.995 |
| 1000 | 2.0 | 99.9995 |

However, even if a temperature for heating PCB is tried to be increased, there is a limit of heat resistance of the heating device or a quantity of the energy consumption and actually a temperature of approximately 1500° C. is an upper limit in actual fact. Thus, in order to further improve the decomposition ratio of PCB, it is desired that the heating device is maintained at a temperature as high as possible and the staying time of PCB in the heating device is prolonged.

However, when a vertical furnace and the like is utilized to heat PCB in particular, even if PCB is dropped from the top of the furnace, it immediately reaches a lower part of the furnace, and the staying time becomes, e.g., not more than 0.5 second, thereby making it difficult to increase the decomposition ratio of PCB.

Thus, it is an object of the present invention to provide a decomposition processing apparatus for PCB which can prolong the staying time of PCB even in a vertical furnace and the like.

DISCLOSURE OF INVENTION

To achieve this aim, according the present invention, there is provided a PCB decomposition processing apparatus for subjecting PCB to thermolysis, the apparatus comprising: heating means; supplying means for supplying PCB in a heating atmosphere obtained by the heating means; and staying means which consists of a porous body having an affinity to PCB and heating resistance in the heating atmosphere, is arranged in the heating atmosphere to hold PCB supplied from the supplying means and temporarily causes PCB to stay in the heating atmosphere.

Since the staying means has an affinity to PCB, PCB is held by the staying means without being dripped off in the middle of processing. Therefore, the staying time in the heating space can be prolonged. Further, since PCB is held in the porous body, a contact area between PCB and heating air can be increased as compared with the case where PCB is retained in a container or flows in a groove-like channel as it is. Thus, since a contact area between PCB and oxygen can be increased and heat of the heating atmosphere can be efficiently supplied to PCB, the decomposition reaction of PCB can be facilitated. For these reasons, the decomposition ratio of PCB can be increased.

Further, it is preferable that a plurality of staying means are arranged in the vertical direction and guiding means is provided between the respective staying means, which retains PCB dropped from the staying means on the upper side in the heating atmosphere while guiding it to the staying means on the lower side. In this case, since PCB can be held by a plurality of the staying means in sequence by the guiding means, PCB can stay in the heating atmosphere for a long time. Also, PCB can be caused to stay in the heating atmosphere when guided by the guiding means.

Furthermore, it is preferable that the staying means is horizontally set and drops from the central part PCB supplied from the upper part, the guiding means is horizontally set and drops from the periphery of the guiding means PCB supplied from the upper part, and the staying means and the guiding means are arranged in the vertical direction in sequence. In this case, PCB supplied from the upper part of the decomposition processing apparatus is collected to the central part and caused to drop by the staying means. The dropped PCB is received by the guiding means arranged immediately below the staying means and caused to drop from the periphery. Moreover, the dropped PCB is received by another staying means arranged immediately below the guiding means, and alternate reception by the staying means and the guiding means is carried out for at least one time. As a result, PCB is also moved in the horizontal direction in addition to the dropping movement, the staying time of PCB in the heating space can be prolonged.

In addition, it is preferable that the staying means and the guiding means are platy have a dropping portion which protrudes downward being provided on each lower surface thereof and the dropping portions of the staying means and the guiding means which are adjacent to each other in the vertical direction are staggered in the horizontal direction and set.

For example, the dropping portion of the staying means is positioned at the center of the lower surface of the staying means, and the dropping portion of the guiding means is positioned on the periphery of the lower surface of the guiding means. Since the positions of the staying means and the guiding means to which PCB is dropped and the positions at which PCB is dropped from the staying means and the guiding means deviate from each other in the horizontal direction, the time that PCB is held in the staying means and the guiding means is prolonged, and the staying time in the heating atmosphere can be extended.

Alternatively, the staying means and the guiding means may be platy, and they are slightly inclined from the horizontal state and alternately arranged in the vertical direction by alternately changing the inclination directions. Further, of the staying means and the guiding means which are adjacent to each other in the vertical direction, a part which is slightly lower than an uppermost part of the lower means may be positioned directly below a lowermost part of the upper means. In this case, PCB supplied to the staying means or guiding means on the uppermost stage is held in that means and temporarily stays. Thereafter, PCB drops from the lowermost part of that means. PCB falls on the part which is slightly lower than the uppermost part of the next means, and it stays and drops from the lowermost part while moving in the horizontal direction by that means. By repeating this process, PCB is subjected to thermolysis before dropping from the lowermost part of the staying means or the guiding means at the lowermost stage. Thus, since PCB is held while moving in the horizontal direction, the staying time in the heating space can be prolonged and PCB can be decomposed at a high ratio.

In particular, when the guiding means is a plate for dropping PCB from its periphery, since the distance for horizontal movement can be set maximum, the staying time can be prolonged. Further, when the guiding means is a perforated plate having at least one through hole for passing PCB and the heating atmosphere, since the heating atmosphere can pass through the guiding means, PCB can be more actively brought into contact with air, and heating of PCB can be attained. Therefore, thermolysis of PCB can be facilitated.

On the other hand, the staying means may be platy, and a plurality of the staying means may be arranged in the vertical direction. A dropping portion which protrudes downward may be provided on the lower surface of each staying means, and the dropping portions of the staying means which are adjacent to each other in the vertical direction may be staggered in the horizontal direction. Furthermore, the lower staying means may be arranged directly below the dropping portion of the upper staying means. In this case, since PCB can be held by a plurality of the staying means in sequence, it can be retained in the heating atmosphere for a long time.

Here, when the staying means having the dropping portion positioned at the center of the lower surface of the staying means and the staying means having the dropping portion positioned on the periphery of the lower surface of the staying means are alternately arranged, PCB which has dropped from the central part of the staying means having the dropping portion at the center drops from the periphery in the staying means on the next stage, and it drops from the central part again in the next means. This process is repeated. Therefore, since PCB is held while moving in the horizontal direction, the staying time in the heating atmosphere can be prolonged, and PCB can be decomposed at a high ratio.

Alternatively, the staying means may be slightly inclined from the horizontal state, and arranged in the vertical direction by alternately changing the inclination directions. Moreover, the staying means which are adjacent to each other in the vertical direction can be arranged in such a manner that a part which is slightly lower than an uppermost part of the lower staying means can be positioned directly below a lowermost part of the upper staying means. In this case, PCB which has been supplied to the staying means on the uppermost stage is held in that staying means and temporarily stayed, and then drops from the lowermost part of that means. PCB which has dropped now drops to the part which is slightly lower than the uppermost part of the staying means on the next stage, and is held in that staying means. After temporarily staying, PCB drops from the lowermost part of that means. By repeating this process, PCB is subjected to thermolysis till it drops from the lowermost part of the staying means on the lowermost stage. Since this process can also cause horizontal movement of PCB as well as dropping action, the staying time in the heating space can be prolonged, and PCB can be decomposed at a high ratio.

In addition, it is preferable that the staying means is accumulation type porous ceramics. In this case, the staying means having the porosity according to the dimensions of the staying means or a quantity of PCB to be processed can be arbitrarily molded. Here, the accumulation type porous ceramics is obtained by accumulating lines of ceramics extruded from a nozzle and forming a porous body with air holes generated between these lines.

This staying means may be ceramic noodles obtained by circularly winding and accumulating filate ceramics (for example, brand name: Actothermic manufactured by Kobe Steel, Ltd). The ceramic noodle has a such a shape as that many coil springs overlap and has the high thermal shock performance. In addition, the thermal shock performance of the ceramic noodle can be improved as compared with a honeycomb compact consisting of the same material.

When the staying means is made of the ceramic noodles, it is possible to obtain the staying means having porosities which differ depending on a filament diameter, a winding diameter or a difference in accumulation pattern. For example, when the filament diameter is changed to any of 1.0, 1.5, 2.0 mm and the like and the accumulation pattern is changed, the porosity can be adjusted to 40 to 80%. Therefore, the staying means having the porosity according to a quantity of PCB to be processed can be arbitrarily molded.

As the staying means, one obtained by accumulating filament ceramics in the lattice form may be used. In this case, the staying means having the different porosity can be likewise obtained in accordance with a difference in accumulation pattern such as a filament diameter, an interval between lines or an angle of overlap. Therefore, the staying means having the porosity according to a quantity of PCB to be processed can be selected.

Here, as the accumulation type porous ceramics, one made of mullite or alumina can be used. Since a fusing point of each of mullite and alumina is not less than 1800° C. and a softening temperature of the same exceeds 1450° C., the heat resistance in the heating atmosphere can be provided. Mullite is expressed by a composition formula $3Al_2O_3 \cdot 2SiO_2$, and its composition ratios are $Al_2O_3$:76.6 wt % and $SiO_2$:23.1 wt %.

Further, the staying means may be a block body or a honeycomb structure consisting of a porous material. In such a case, since a contact area between PCB and heating air can be likewise increased, a contact area between PCB and oxygen can be increased and, at the same time, heat of the heating atmosphere can be efficiently supplied to PCB. Therefore, the decomposition reaction of PCB can be proceeded and the decomposition ratio can be increased.

On the other hand, in this PCB decomposition processing apparatus, it is preferable that the heating means is a combustion portion of a blast furnace and the supplying means and the staying means are installed in the blast furnace. Therefore, since the thermal energy of the blast furnace can be directly used for thermolysis of PCB, the lost thermal energy is small and the decomposition efficiency can be increased. Also, PCB can be heated at a temperature of 1000 to 1450° C. which is preferable as a heating temperature for increasing the decomposition ratio of PCB to not less than 99.9999%.

Further, it is preferable that a temperature for heating PCB is 1000 to 1450° C. and a time for heating PCB is 1.0 to 3.5 seconds. If the temperature and the time fall within these ranges, the decomposition ratio of PCB can be set to not less than 99.9999%. In order to increase the decomposition ratio of PCB to not less than 99.9999%, if the heating temperature is, e.g., 1450° C., the staying time of 1.0 second can suffice. Furthermore, if the staying time is, e.g., 3.5 seconds, the heating temperature of 1000° C. can suffice.

Moreover, the heating temperature required for increasing the decomposition ratio of PCB to not less than 99.9999% is preferably 1000 to 1450° C. and, more preferably, it is 1200 to 1400° C. In order to increase the decomposition ratio to not less than 99.9999% with the heating temperature which is less than 1000° C., the staying time must be prolonged so as to exceed, e.g., 3.5 seconds. As a result, the path of PCB becomes long and the size of the decomposition processing apparatus is increased, which is not preferable. Moreover, with the heating temperature exceeding 1450° C., the staying means made of ceramics may be possibly deformed, which is not preferable.

In addition, as the staying time required for increasing the decomposition ratio of PCB to not less than 99.9999%, it is preferably 1.0 to 3.5 seconds and, more preferably, it is 2.0 to 3.5 seconds. In order to obtain the decomposition ratio which is not less than 99.9999% with the staying time less than 1.0 second, the heating temperature must be increased so as to exceed 1450° C., which is not preferable. Additionally, the staying time exceeding 3.5 seconds extends the path of PCB and increases the size of the decomposition processing apparatus, which is not preferable.

BEST MODE FOR CARRYING OUT OF THE INVENTION

Figure 1:
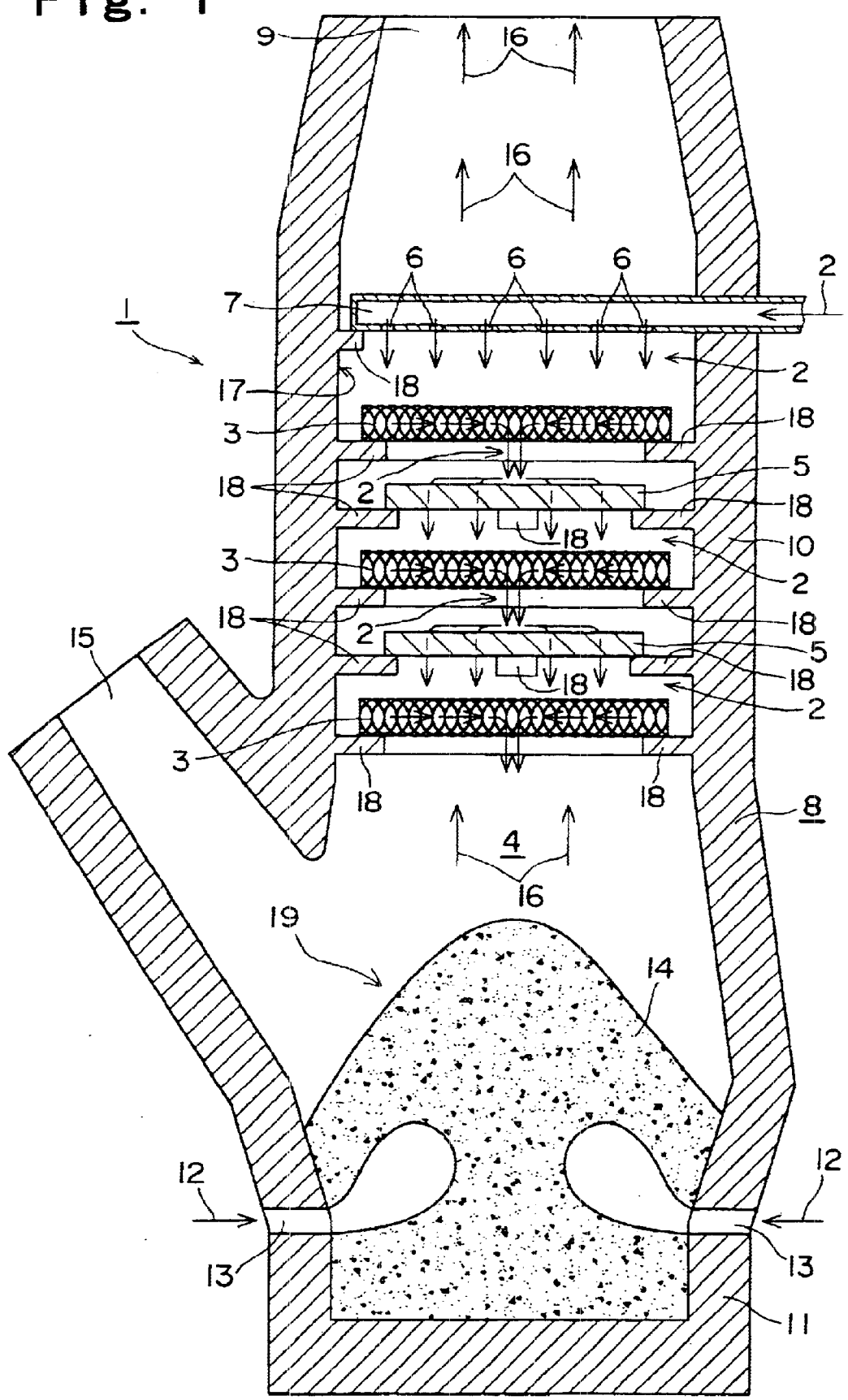
FIG. 1 is a central vertical cross-sectional view showing an embodiment of a decomposition processing apparatus for PCB according to the present invention.
Figure 1A:
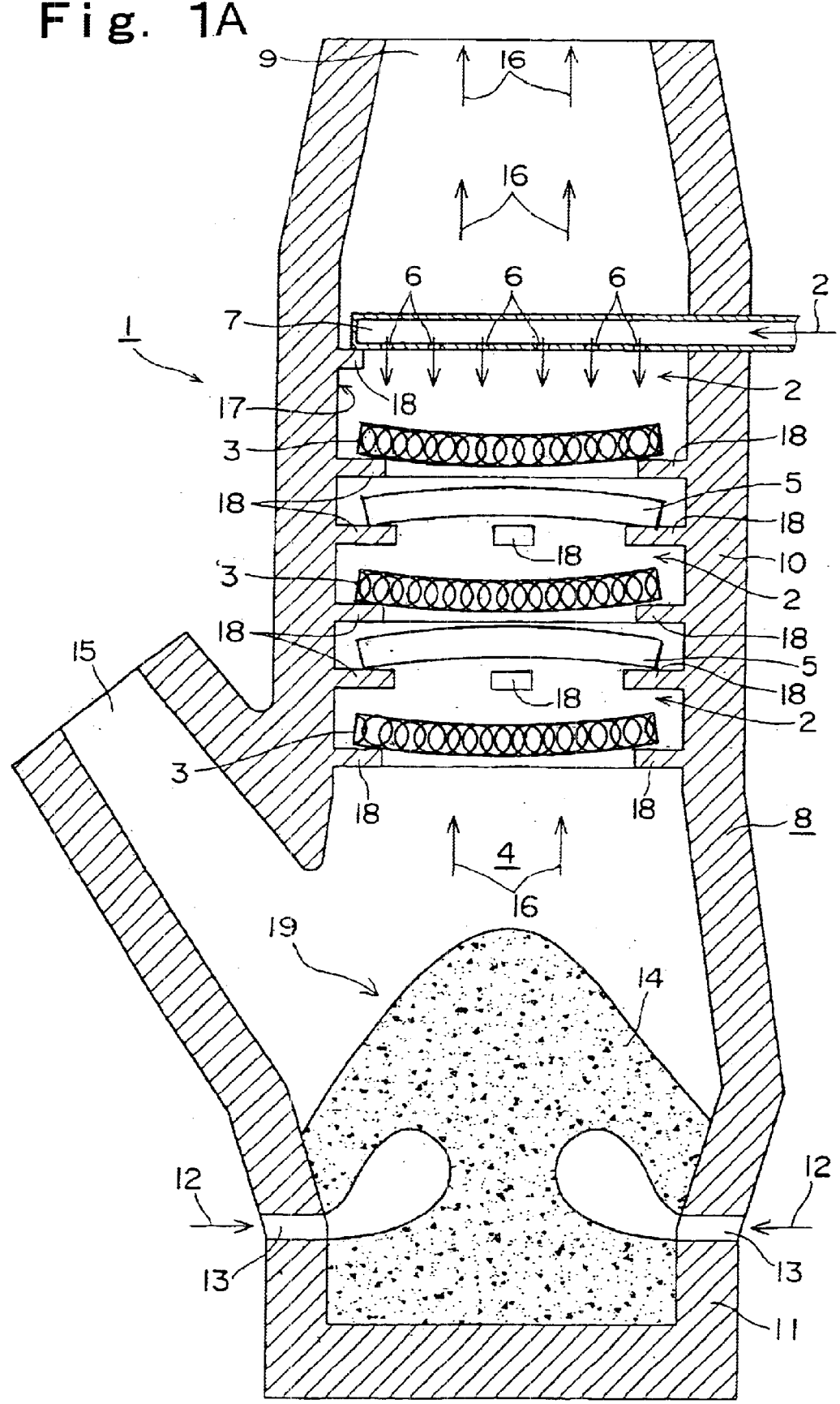
FIG. 1A is a view similar to FIG. 1 illustrating various geometries for certain components of the invention.
Figure 1B:
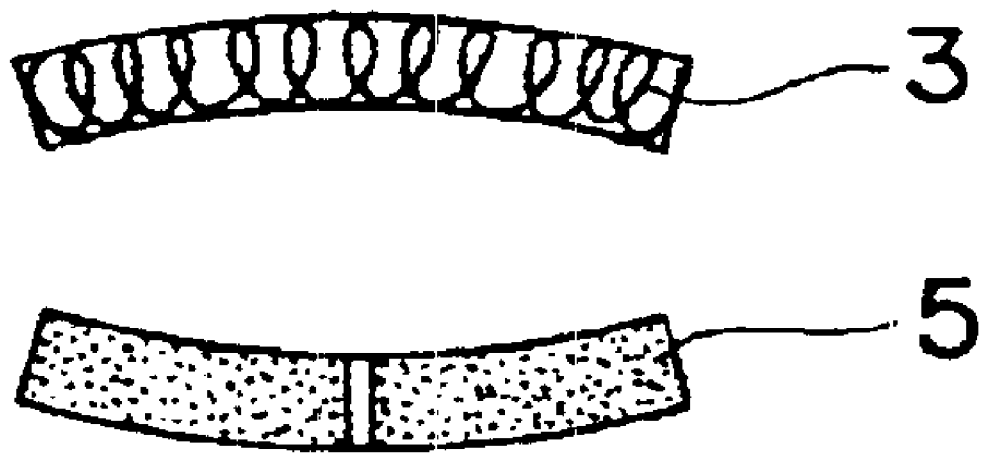
FIG. 1B is a schmatic representation of the staying means with guiding means according to an embodiment of the invention.

The structure of the present invention will now be described in detail hereinafter based on an illustrative embodiment. A decomposition processing apparatus for PCB 1 according to the present invention heats and decomposes PCB 2, and includes heating means 19, supplying means 7 for supplying PCB 2 into a heating atmosphere 16 obtained by the heating means 19, and staying means 3 which is arranged in the heating atmosphere 16, holds PCB 2 supplied from the supplying means 7 and causes PCB 2 to temporarily stay in the heating atmosphere 16. The staying means 3 has an affinity to PCB 2 and consists of a porous body having the heat resistance in the heating atmosphere 16.

Therefore, since the staying means 3 has an affinity to PCB 2, PCB 2 is held by the staying means 3 without dropping in the middle of the process. Therefore, the staying time in a heating space 4 can be prolonged. Additionally, since PCB 2 is held inside the porous body, a contact area between PCB 2 and the heating atmosphere 16 can be increased as compared with a case where PCB 2 is retained in a container or it flows in a groove-like flow path as it is. Therefore, a contact area between PCB 2 and oxygen can be increased, and heat of the heating atmosphere 16 can be efficiently supplied to PCB 2, thereby facilitating the decomposition reaction of PCB 2. For these reasons, the decomposition ratio of PCB 2 can be increased.

Further, a plurality of the staying means 3 are arranged in the vertical direction, and guiding means 5 which guides PCB 2 dropped from the upper staying means 3 to the lower staying means 3 while causing PCB 2 to stay in the heating atmosphere 16 is provided between the respective staying means 3.

The staying means 3 is horizontally installed and drops from its central part PCB 2 supplied from the upper part. Furthermore, the guiding means 5 is horizontally installed and drops from its periphery PCB 2 supplied from the upper part. Moreover, the staying means 3 and the guiding means 5 are sequentially arranged in the vertical direction. Therefore, PCB 2 supplied from the upper part of the decomposition processing apparatus 1 is collected in the central part and dropped by the staying means 3. The dropped PCB 2 is received by the guiding means 5 arranged immediately below the staying means 3, and it is dropped from the periphery of the guiding means 5. In addition, the dropped PCB 2 is received by the staying means 3 arranged immediately below the guiding means 5, and alternate reception by the staying means 3 and the guiding means 5 is performed at least once. As a result, in addition to the dropping movement, PCB 2 is caused to move in the horizontal direction, thereby prolonging the staying time in the heating space 4.

The staying means 3 is, for example, discoid. Additionally, when a sufficient amount of PCB 2 is supplied to the staying means 3 from the upper part and held in the entire staying means 3, the held PCB 2 is dropped from the central part. It can be considered that the entire PCB 2 tends to gather to the central part by the surface tension and drops from the central part since PCB 2 is held in the entire area of the staying means 3 and becomes a lump of liquid. Alternatively, it can be also considered that PCB 2 drops from the central part since the staying means 3 bends in such a manner that its central part slightly protrudes downward by being held at its peripheral portion.

The guiding means 5 is, for example, discoid. Therefore, PCB 2 supplied from the upper part to the guiding means 5 is dropped from the periphery of the guiding means 5. That is, the guiding means 5 functions as a dispersing member for dispersing PCB 2 dropped to the central part to the periphery. Moreover, the guiding means 5 may be entirely bent upward and set so that the central part becomes the highest. In this case, PCB 2 dropped to the central part can be readily dispersed to the periphery.

In this embodiment, three staying means 3 and two guiding means 5 are alternately arranged. In addition, the supplying means 7 is set above the staying means 3 on the uppermost stage. The supplying means 7 is a supply tube having a plurality of discharge ports 6. A flow rate for supplying PCB 2 from the supplying means 7 is such that PCB 2 is held in the entire area of the staying means 3 and then drops from the central part.

PCB 2 supplied from the supplying means 7 is collected to the central part by the staying means 3 on the uppermost stage and then drops. The dropped PCB 2 is received by the guiding means 5 arranged immediately below the staying means 3 and then drops from its periphery. Additionally, the dropped PCB 2 is received by the staying means 3 arranged immediately below the guiding means 5, and similarly drops from the central part in the staying means 3. Then, PCB 2 drops from the periphery of the guiding means 5. This process is repeated. As a result, in addition of the dropping movement, PCB 2 is caused to move in the horizontal direction, thereby prolonging the staying time in the heating space 4.

The staying means 3 is formed by accumulation type porous ceramics. This accumulation type porous ceramics is made of, e.g., mullite, and a so-called ceramic noodle obtained by circularly winding filate ceramics and accumulating it is used in this example. Therefore, it is possible to obtain the staying means 3 having the porosity which varies depending on a filate diameter, a winding diameter or a difference in accumulation pattern. Thus, the staying means 3 having the porosity according to a quantity of PCB 2 to be processed can be arbitrarily molded.

In the decomposition processing apparatus 1 according to this embodiment, the heating means 19 is a combustion portion of a blast furnace 8, and the supplying means 7 and the staying means 3 are set in the blast furnace 8. Further, the combustion atmosphere 16 is combustion gas in the blast furnace 8 (which will be referred to as combustion gas 16 hereinafter). The blast furnace 8 includes: a furnace portion 10 which is cylindrical and has a throat portion 9 on the upper side; a hearth portion 11 formed on the lower part of the furnace portion 10; a tuyere 13 which is formed on the upper side of the hearth portion 11 and sends combustion air 12; and a supply pipe 15 for supplying cokes 14 to the lower part of the furnace portion 10. Furthermore, the cokes 14 supplied from the supply pipe 15 are deposited on the hearth of the furnace portion 10 and burned by air 12 blown from the tuyere 13. The combustion gas 16 flows upward in the furnace portion 10 and is emitted from the throat portion 9. Since the structure of the hearth portion 11, the tuyere 13 and the supply pipe 15 are the same as that of a well-known blast furnace, the detailed description will be omitted.

A block 18 for horizontally supporting each of the staying means 3 and the guiding means 5 to provide a space therebetween is formed on the inner wall surface 17 consisting of a fire and heat resistant material of the furnace portion 10. It is determined that the surface of each block 18 has the heat resistance which is equivalent to that of the inner wall surface 17 of the furnace portion 10. Further, the supplying means 7 pierces the furnace wall of the furnace portion 10, and an end portion of the supplying means 7 is supported by the block 18.

The block 18 for supplying the staying means 3 is provided in the annular form along the circumferential direction of the inner wall surface 17. Therefore, since the combustion gas 16 can pass through the inside of the staying means 3, the staying means 3 can be efficiently heated. Further, in some cases, the block 18 may be divided into a plurality of pieces and provided along the circumferential direction of the inner wall surface 17. In this case, the combustion gas 16 can pass through the space between the edge of the staying means 3 and the blocks 18, and the pressure loss can be reduced.

Furthermore, the block 18 supporting the guiding means 5 is divided into a plurality of pieces and provided along the circumferential direction of the inner wall surface 17. Therefore, the combustion gas 16 passes through the space between the edge of the guiding means 5 and the blocks 18.

Moreover, although not illustrated in particular, means for giving oxygen or air to PCB 2 in order to facilitate decomposition of PCB 2 may be provided separately from the tuyere 13. For example, a port piercing the furnace wall in the vicinity of the lower part of the staying means 3 on the lowermost stage is formed so that oxygen or air can be supplied from this port.

In order to increase the decomposition ratio of PCB 2 to not less than 99.9999%, the staying time of 1.0 second can suffice if the heating temperature is, e.g., 1450° C., and the heating temperature of 1000° C. can suffice if the staying time is, e.g., 3.5 seconds. Since heat of the blast furnace 8 is utilized in this embodiment, PCB 2 can be heated to 1000 to 1450° C. which is preferable as a heating temperature in order to increase the decomposition ratio of PCB 2 to not less than 99.9999%.

The procedure for decomposing PCB 2 by the above-described decomposition processing apparatus 1 will now be described hereinafter.

The cokes 14 are supplied from the supply pipe 15 in advance, and the combustion air 12 is supplied from the tuyere 13, thereby performing combustion. The combustion gas 16 generated at this moment is used to heat the staying means 3 and the guiding means 5. Then, when the staying means 3 and the guiding means 5 are heated to, e.g., 1000 to 1450° C., PCB 2 is supplied from the supplying means 7. The supplied PCB 2 moves on the inside or the surface of the staying means 3, is caused to drop from the central portion and then caused to drop from the periphery by the guiding means 5. This process is repeated. In addition, PCB 2 is subjected to thermolysis before dropping from the staying means 3 on the lowermost stage. PCB 2 can stay in the furnace for 1.0 to 3.5 seconds by being guided by the staying means 3 and the guiding means 5. Thus, PCB 2 can be decomposed at a high ratio of not less than 99.9999%.

Incidentally, the above-described embodiment is a preferred embodiment according to the present invention, the present invention is not restricted thereto, and various modifications can be carried out without departing from the scope of the invention. For example, although the staying means 3 is accumulation type porous ceramics in this embodiment, the present invention is not restricted thereto, and a block body or a honeycomb structure consisting of a porous material may be used. In such a case, since a contact area between PCB 2 and the heating atmosphere 16 can be increased, a contact area between PCB 2 and oxygen can be also increased, and heat of the heating atmosphere 16 can be efficiently supplied to PCB 2. Therefore, the decomposition reaction of PCB 2 can be facilitated, thereby increasing the decomposition ratio of PCB 2.

Additionally, although three staying means 3 and two guiding means 5 are provided in this embodiment, the number of these members is not restricted to the above-described figures, and any number can be used as long as the staying time by which PCB 2 can be decomposed at a high ratio can be assured. For example, it varies depending on areas of the staying means 3 and the guiding means 5.

Further, although the staying means 3 and the guiding means 5 are supported by the respective blocks 18 in this embodiment, the present invention is not restricted thereto and, for example, a plurality of staying means 3 and guiding means 5 adjacent to each other are integrated as a cartridge, and this may be supported by only the block 18 on the lowermost stage. In this case, it is preferable that an access portion capable of causing the inside of the furnace portion 10 to communicate with the outside or closing the furnace portion 10 is formed on the side portion of the furnace portion 10 in advance and the cartridge is inserted or removed from the access portion.

Further, although all the staying means 3 are made of mullite in this embodiment, the present invention is not restricted thereto, and alumina or cordierite may be used. Cordierite is expressed by a composition formula $2Al_2O_3 \cdot 5SiO_2 \cdot 2MgO$ and the composition ratios are $Al_2O_3$:34.3 wt %, $SiO_2$:51.0 wt % and MgO:13.2 wt %. Furthermore, although all the staying means 3 consist of the same material, the present invention is not restricted thereto, and a material of the upper staying means 3 may be different from that of the lower staying means 3. That is, a material having a high fusing point such as mullite or alumina is used for the lower layer in which a temperature of the heating atmosphere 16 is high, and a material having a relatively low fusing point such as cordierite is used for the upper layer in which a temperature of the heating atmosphere 16 is lower than that in the lower layer. In particular, although the fusing point of cordierite is 1450° C., a temperature at which the material is softened is lower than that temperature. Therefore, it is preferable to use cordierite to the upper layer.

Further, the porosity of the porous body of the upper staying means 3 may be different from that of the porous body of the lower staying means 3. For example, the porosity of the lower layer is increased so that the heating gas 16 can readily pass therethrough, and the porosity of the upper layer is lowered so that the heating efficiency of PCB 2 is increased.

Furthermore, although the guiding means 5 is platy without a hole so that PCB 2 is caused to drop from only the circular periphery in this embodiment, the present invention is not restricted thereto and, for example, a notch may be provided to the periphery. Alternatively, radial support legs may be formed around the guiding means 5 in order that the support legs can be supported by the block 18. In these cases, even if the block 18 supporting the guiding means 5 is formed into an annular shape, the heating gas 16 can pass through the notch or a space between the support legs and the block 18.

Moreover, the guiding means 5 may be, for example, a perforated plate made of ceramics having at least one through hole for passing the heating atmosphere 16. In this case, PCB 2 dropped to the guiding means 5 drops from the periphery or passes through the through hole and then drops. In addition, since the guiding means 5 is a perforated plate, the heating atmosphere 16 can pass through the guiding means 5. Therefore, PCB 2 can sufficiently come into contact with oxygen and PCB 2 can be heated. Also, the flow of the heating atmosphere 16 can be improved, thereby reducing the pressure loss caused due to heating by the heating means 19.

In addition, as to arrangement of through holes when the guiding means 5 is a perforated plate, it is preferable that these holes are unevenly distributed in the vicinity of the periphery. That is, the through hole of the perforated plate is formed in such a manner that the permeability becomes small at a part close to the center and that becomes large at a part close to the periphery. With this arrangement, PCB 2 dropped from the upper staying means 3 to the central part does not immediately drop from the through hole but flows to the peripheral edge and gradually drops, thereby prolonging the staying time.

Additionally, although the staying means 3 and the guiding means 5 are horizontally set circular flat plates in the above-described embodiment, the present invention is not restricted thereto, and each of the staying means 3 and the guiding means 5 may have a dropping portion which protrudes downward on the lower surface. Further, the dropping portions of the staying means 3 and the guiding means 5 which are adjacent to each other in the vertical direction may be staggered in the horizontal direction and set.

Figure 3:
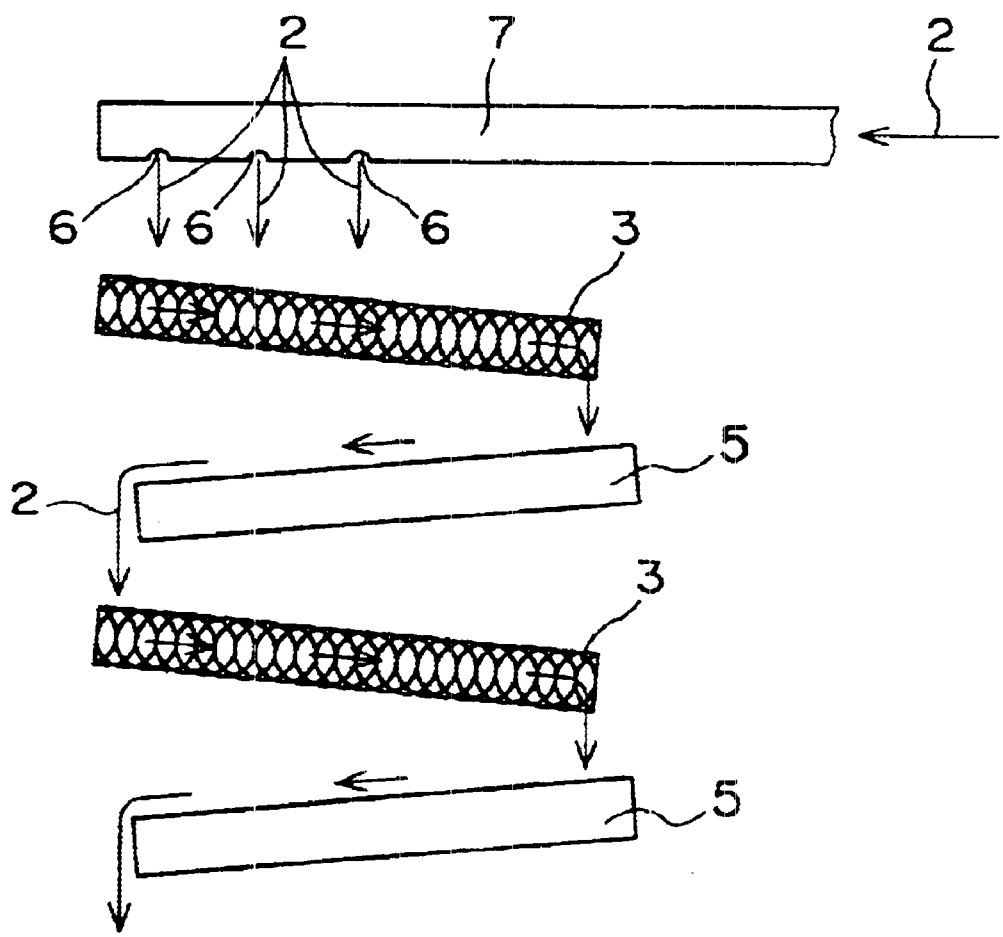
FIG. 3 is a schematic view showing arrangement of the porous bodies in still another embodiment of the decomposition processing apparatus for PCB.

For example, the dropping portion of the staying means 3 may be positioned at the center of the lower surface thereof, and the dropping portion of the guiding means 5 may be positioned on the periphery of the lower surface of the guiding means 5. In this case, the staying means 3 has such a shape as that its central portion is curved downward. Furthermore, the guiding means 5 has such a shape as that its central portion is warped upward. Alternatively, the dropping portion of the staying means 3 may be positioned on the periphery of the lower surface of the staying means 3 and the dropping portion of the guiding means 5 may be positioned at the center of the lower surface of the guiding means 5. In this case, the staying means 3 has a shape that its central portion is curved upward. Moreover, the guiding means 5 has a shape that its central portion is warped downward and a through hole for dropping down the collected PCB 2 is formed at the central portion of the guiding means 5. Alternatively, as shown in FIG. 3 the staying means 3 and the guiding means 5 may be alternately arranged in the vertical direction in such a manner that they are slightly inclined from the horizontal state and their inclination directions are alternately changed. In addition, the staying means 3 and the guiding means 5 which are adjacent to each other in the vertical direction may be arranged in such a manner that a portion which is slightly lower than an uppermost portion of the lower means can be positioned directly below a lowermost portion of the upper means. In either case, since PCB 2 is moved in the horizontal direction in addition to the dropping movement, the staying time in the heating space 4 can be prolonged, thereby facilitating the thermolysis of PCB 2.

Figure 2:
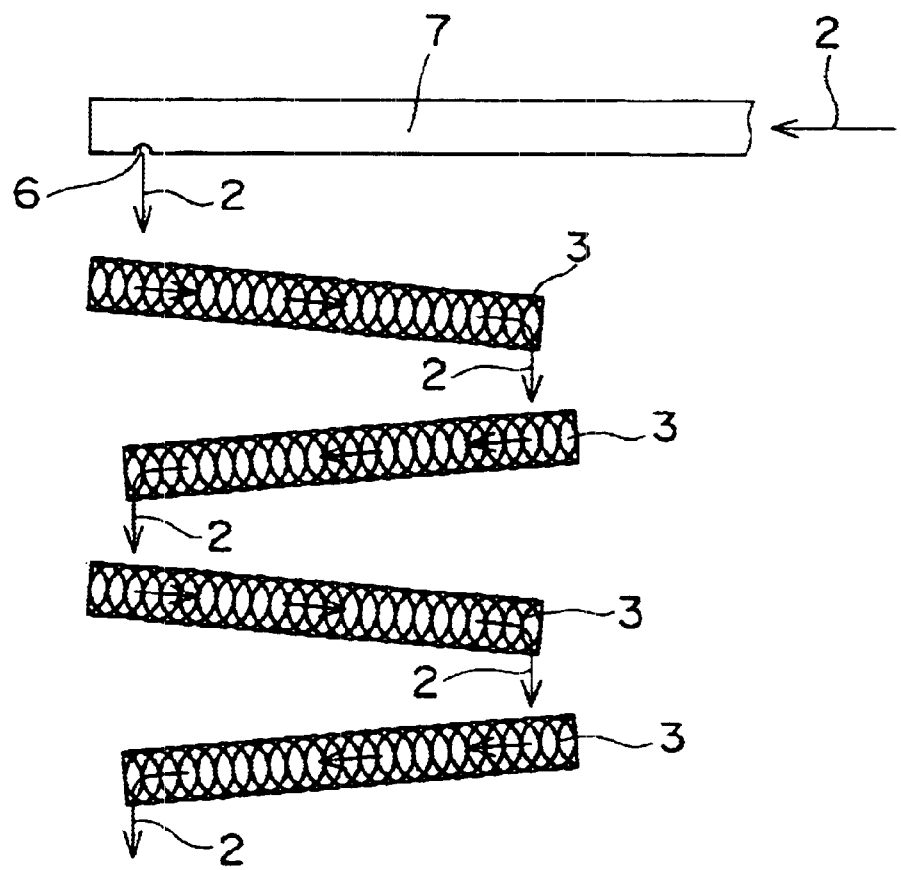
FIG. 2 is a schematic view showing arrangement of porous bodies in another embodiment of the decomposition processing apparatus for PCB.

Additionally, although the guiding means 5 is arranged between the staying means 3 in this embodiment, the present invention is not restricted thereto, and the guiding means 5 may be omitted. For example, as shown in FIG. 2, the staying means 3 slightly inclined from the horizontal state may be arranged in the vertical direction with the inclination directions being alternately changed. In this case, the staying means 3 and 3 which are adjacent to each other in the vertical direction may be arranged in such a manner that they are staggered each other in the horizontal directions and also a portion which is slightly lower than an uppermost portion of the lower staying means 3 is positioned directly below a lowermost portion of the upper staying means 3. Further, the discharge port 6 of the supplying means 7 is formed so as to supply PCB 2 to the portion which is slightly lower than the uppermost portion in the staying means 3 on the uppermost stage.

According to this structure, PCB 2 supplied from the supplying means 7 to the staying means 3 on the uppermost stage is held and temporarily retained by that staying means 3 and then drops from the lowermost portion of that staying means 3. The dropped PCB 2 drops to the portion which is slightly lower than the uppermost portion of the staying means 3 on the next stage, and is held and temporarily retained in that staying means 3. Thereafter, PCB 2 then drops from the lowermost portion of that staying means 3. By repeating this process, PCB 2 is subjected to thermolysis before dropping from the lowermost portion of the staying means 3 on the lowermost stage. In this case, since PCB 2 is moved in the horizontal direction in addition to the dropping movement, the staying time in the heating space 4 can be prolonged and PCB 2 can be decomposed at a high ratio.

Furthermore, although the staying means 3 whose inclination directions are alternately changed are arranged in the vertical direction in the embodiment shown in FIG. 2, the present invention is not restricted thereto, and the staying means 3 whose dropping portion is positioned at the center of the lower surface and the staying means 3 whose dropping portion is positioned on the periphery of the lower surface may be alternately arranged. In this case, PCB 2 drops from the center of the staying means 3 and then drops from the periphery of the next staying means 3. This process is repeated.

Moreover, although the staying means 3 and the guiding means 5 have a circular shape in each embodiment mentioned above, the present invention is not restricted thereto, and a rectangular shape, a polygonal shape, a cylindrical shape or a solid-core bar-like shape may be adopted. If the staying means 3 and the guiding means 5 are, for example, rectangular, a segment-like gap is formed between the periphery of the staying means 3 and the guiding means 5 and the inner wall surface 17 since the furnace portion 10 of the blast furnace 8 usually has a cylindrical shape. Moreover, since the combustion gas flows upward through this gap, the heating atmosphere 16 can be sufficiently supplied to the staying means 3 and the guiding means 5. Therefore, heat and oxygen are sufficiently given to PCB 2, thereby facilitating the decomposition reaction of PCB 2. In addition, if the staying means 3 and the guiding means 5 have, for example, a bar-like shape, a plurality of these means are arranged in parallel along the inclination directions, for example.

Additionally, although the staying means 3 and the guiding means 5 are provided in the blast furnace 8 in the foregoing embodiments, the present invention is not restricted thereto, and they may be provided to general types of the heating apparatus such as an incinerator capable of heating to approximately 1000 to 1450° C.

What is claimed is:

1. A decomposition processing apparatus for PCB for subjecting liquid PCB to thermolysis, said decomposition processing apparatus for PCB comprising: heating means; supplying means for dropping and supplying said liquid PCB to a heating atmosphere above said heating means; and staying means consisting of porous ceramics having an affinity to said liquid PCB and heat resistance in said heating atmosphere, being arranged in said heating atmosphere, holding said liquid PCB supplied from said supplying means, and temporarily retained said liquid PCB in said heating atmosphere.

2. A decomposition processing apparatus for PCB according to claim 1, wherein a plurality of said staying means are arranged in a vertical direction, and guiding means which guides said liquid PCB dropped from said staying means on an upper side to said staying means on a lower side while retaining said liquid PCB in said heating atmosphere is provided between said respective staying means.

3. A decomposition processing apparatus for PCB according to claim 2, wherein said staying means is horizontally set and drops from a central portion thereof said liquid PCB supplied from an upper part, said guiding means is horizontally set and drops from a periphery thereof said liquid PCB supplied from an upper part, and said staying means and said guiding means are alternately arranged in a vertical direction.

4. A decomposition processing apparatus for PCB according to claim 2, wherein said guiding means is a plate for dropping said liquid PCB from a periphery thereof.

5. A decomposition processing apparatus for PCB according to claim 2, wherein said guiding means is a perforated plate having at least one through hole for passing said liquid PCB and said heating atmosphere therethrough.

6. A decomposition processing apparatus for PCB according to claim 1, wherein said staying means is accumulation type porous ceramics.

7. A decomposition processing apparatus for PCB according to claim 6, wherein said staying means is a ceramic noodle obtained by circularly winding and accumulating filate ceramics.

8. A decomposition processing apparatus for PCB according to claim 6, wherein said staying means is obtained by accumulating filate ceramics in a lattice form.

9. A decomposition processing apparatus for PCB according to claim 6, wherein said accumulation type porous ceramics is made of mullite.

10. A decomposition processing apparatus for PCB according to claim 6, wherein said accumulation type porous ceramics is made of alumina.

11. A decomposition processing apparatus for PCB according to claim 1, wherein said staying means is a block body consisting of a porous material.

12. A decomposition processing apparatus for PCB according to claim 1, wherein said staying means is a honeycomb structure consisting of a porous material.

13. A decomposition processing apparatus for PCB according to claim 1, wherein said heating means is a combustion portion of a blast furnace, and said supplying means and said staying means are provided in said blast furnace.

14. A decomposition processing apparatus for PCB according to claim 1, wherein a temperature for heating said liquid PCB is 1000 to 1450° C., and a time for heating said liquid PCB is 1.0 to 3.5 seconds.

* * * * *